United States Patent
Lin et al.

(10) Patent No.: US 8,198,830 B2
(45) Date of Patent: Jun. 12, 2012

(54) PERCEPTUALLY LINEAR LED BRIGHTNESS CONTROL

(75) Inventors: Shui-Mu Lin, Longjing Township, Taichung County (TW); Tsung-Wei Huang, Jubei (TW); Jien-Sheng Chen, Toufen Township, Miaoli County (TW); Kwan-Jen Chu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 328 days.

(21) Appl. No.: 12/320,503

(22) Filed: Jan. 28, 2009

(65) Prior Publication Data

US 2009/0195191 A1    Aug. 6, 2009

(30) Foreign Application Priority Data

Feb. 5, 2008 (TW) ................................. 97104484 A

(51) Int. Cl.
*H05B 37/02* (2006.01)
(52) U.S. Cl. .................. 315/307; 315/297; 315/360

(58) Field of Classification Search ............. 315/209 R, 315/224–226, 291, 297, 307–308, 360; 345/77, 345/204; 327/108, 132, 333
See application file for complete search history.

(56) References Cited

U.S. PATENT DOCUMENTS

| | | | | |
|---|---|---|---|---|
| 6,822,403 B2 * | 11/2004 | Horiuchi et al. | ............... | 315/307 |
| 7,592,981 B2 * | 9/2009 | Maeda | ............................. | 345/76 |
| 7,642,724 B2 * | 1/2010 | Muto et al. | ..................... | 315/172 |
| 7,675,245 B2 * | 3/2010 | Szczeszynski et al. | ........ | 315/291 |
| 7,733,034 B2 * | 6/2010 | Kotikalapoodi et al. | ...... | 315/294 |
| 2004/0239654 A1 * | 12/2004 | Okuda | ............................ | 345/204 |
| 2006/0055465 A1 * | 3/2006 | Lin et al. | ....................... | 330/288 |
| 2008/0174253 A1 * | 7/2008 | Noda | ............................. | 315/291 |
| 2009/0322235 A1 * | 12/2009 | Shiu et al. | ................. | 315/185 R |
| 2010/0277094 A1 * | 11/2010 | Emek et al. | .................... | 315/291 |

* cited by examiner

*Primary Examiner* — Tung X Le
(74) *Attorney, Agent, or Firm* — Rosenberg, Klein & Lee

(57) ABSTRACT

A current regulator includes a first current source to provide a reference current varying with a dimming step, and a second current source to generate a drive current for a white LED according to the reference current. The reference current and the dimming step have a relationship identical to or approximating a relationship between luminance and lightness perceived by human eyes. Thus, the white LED is controlled to have a linear variation of the luminance perceived by human eyes when the dimming step is changed.

29 Claims, 20 Drawing Sheets

PERCEPTUALLY LINEAR LED BRIGHTNESS CONTROL

FIELD OF THE INVENTION

The present invention is related generally to light-emitting diode (LED) driving technique and, more particularly, to an apparatus and method for LED brightness control.

BACKGROUND OF THE INVENTION

LEDs are becoming more and more valued because they provide benefits such as low power consumption, long lifetime, small volume and low cost. FIG. 1 is a circuit diagram of a conventional current regulator 10 for driving a white LED 20, which uses a first current source 12 to provide a reference current IREF, and a second current source to generate a direct current (DC) drive current ILED for the white LED 20 according to the reference current IREF. For the second current source, an operation amplifier 14 and two transistors 16 and 18 are so configured to be an low drop-out (LDO) current source, in which the transistor 16 has a drain connected to the first current source 12 to receive the reference current IREF, and a source connected to a ground terminal GND, the operational amplifier 14 has a non-inverting input connected to the drain of the transistor 16, and an output connected to a gate of the transistor 16, the transistor 18 has a drain connected to an inverting input of the operational amplifier 14 and the white LED 20, a source connected to the ground terminal GND, and a gate connected to the output of the operational amplifier 14, and therefore, the transistor 18 will mirror the reference current IREF in the transistor 16 to generate the drive current ILED for the white LED 20. FIG. 2 is a diagram showing a curve which describes the relationship between the reference current IREF and the dimming step of FIG. 1 in linear brightness control. This curve can be expressed by $$IREF = K1 \times STEP, \quad [Eq-1]$$

where K1 is a constant and STEP is the number of the dimming step. FIG. 3 is a diagram showing a curve defined by the relationship between the DC drive current ILED and the dimming step based on the circuit of FIG. 1 and the equation Eq-1. Since the drive current ILED is generated by mirroring the reference current IREF, it will be also linearly proportional to the dimming step as $$ILED = K2 \times IREF = K1 \times K2 \times STEP, \quad [Eq-2]$$

where K2 is the size ratio of the transistors 16 and 18 of FIG. 1. FIG. 4 is a diagram showing a curve which describes the relationship between the luminous intensity (brightness) and the DC drive current of a white LED. As shown by this curve, when the DC drive current increases, the luminous intensity of a white LED increases in linear proportion thereto. In other words, it is a linear relationship between the brightness and the dimming step of a white LED.

Although in linear proportion to the dimming step, the brightness of a white LED varies nonlinearly to human eyes. FIG. 5 is a diagram showing a curve 30 which describes the relationship between the luminance and the lightness of a white LED, and a curve 32 which describes the relationship between the luminance and the lightness perceived by human eyes, in which the luminance Y in the vertical axis represents the actual luminance and the lightness L in the horizontal axis represents the luminance perceived by human eyes. For the curve 30, the lightness L in the horizontal axis may also represent the dimming step. Conventionally, the zero percentage value of the lightness L represents a fully black status, and the hundred percentage value of the lightness L represent a fully white status. Under ideal condition, each time the luminance Y of a white LED varies by $\Delta Y$, human eyes should perceive a lightness variation $\Delta L$ following the curve 30. However, because of the complex structure of human eyes, the real lightness variation $\Delta L$ perceived by human eyes follows the curve 32, in which a significant variation in the luminance Y is necessary for human eyes to perceive a variation in the lightness L where the luminance Y is high, and conversely, where the luminance Y is low, a slight variation in the luminance Y is sufficient to produce a perceptible variation in the lightness L. Therefore, each time the dimming step is changed by one to adjust the luminance Y of a white LED by $\Delta Y$, a different amount of variation in the lightness L is perceived by human eyes. In other words, the dimming step of the current regulator 10 shown in FIG. 1 is nonlinearly proportional to the lightness L perceived by human eyes. FIG. 6 is a diagram showing the error of the luminance Y between the curves 30 and 32 of FIG. 5. As can been seen clearly in FIG. 6, under a same lightness L, a great difference exists between the luminance Y emitted by a white LED and that required by human eyes, especially when the lightness L is around 50.

In the current regulator 10, the dimming step must be appropriately selected in order for human eyes to perceive linear variation in lightness. In the low current region, a slight variation in the luminance of the white LED 20 is sufficient to cause a perceptible variation in lightness. As a result, the number of the dimming step that can be selected in the low current region is relatively small. Conversely, in the high current region, only a large variation in luminance of the white LED 20 leads to a perceptible variation in lightness, so that the number of the dimming step that can be selected in the high current region is relatively large. However, whether it is in the low current region or in the high current region, there will be always some dimming steps left unused and wasted. Moreover, selecting the appropriate dimming steps necessitate complex computation and adds to difficulty in system design.

Therefore, it is desired an apparatus and method for perceptually linear LED brightness control without specially selected dimming steps.

SUMMARY OF THE INVENTION

An object of the present invention is to provide a current regulator and method for driving a white LED with linear luminance variation to human eyes.

Another object of the present invention is to provide a current regulator and method for driving a white LED with approximately linear luminance variation to human eyes.

According to the present invention, a current regulator comprises a first current source to provide a reference current in approximate proportion to $((L+16)/116)^3$, where L represents lightness, a brightness controller to determine the value of L, and a second current source to generate a drive current for a white LED according to the reference current.

According to the present invention, a current regulator comprises a first current source to provide a reference current varying with a dimming step in a relationship approximating that between the luminance and the lightness perceived by human eyes, and a second current source to generate a drive current for a white LED according to the reference current.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

It was known that the luminance Y and the lightness L for human eyes have the relationship $$L=116f(Y/Yn)-16,\quad\quad\quad\quad\text{[Eq-3]}$$

where Yn is the luminance of a fully white status. When $(Y/Yn)>0.008856$, $f(Y/Yn)=(Y/Yn)^{1/3}$; otherwise, $f(Y/Yn)=7.787(Y/Yn)+16/116$. From the equation Eq-3, it can obtain the function $$f(Y/Yn)=((L+16)/116).\quad\quad\quad\quad\text{[Eq-4]}$$

As the range of $(Y/Yn)<0.008856$ is negligible, the equation Eq-3 can be simplified to be $$(Y/Yn)=((L+16)/116)^3.\quad\quad\quad\quad\text{[Eq-5]}$$

Hence, as long as the luminance of a white LED conforms to the equation Eq-5, it complies with the variation of lightness perceived by human eyes. For further details, readers are referred to http://en. wikipedia.org/wiki/Lab_color_space.

Figure 1:
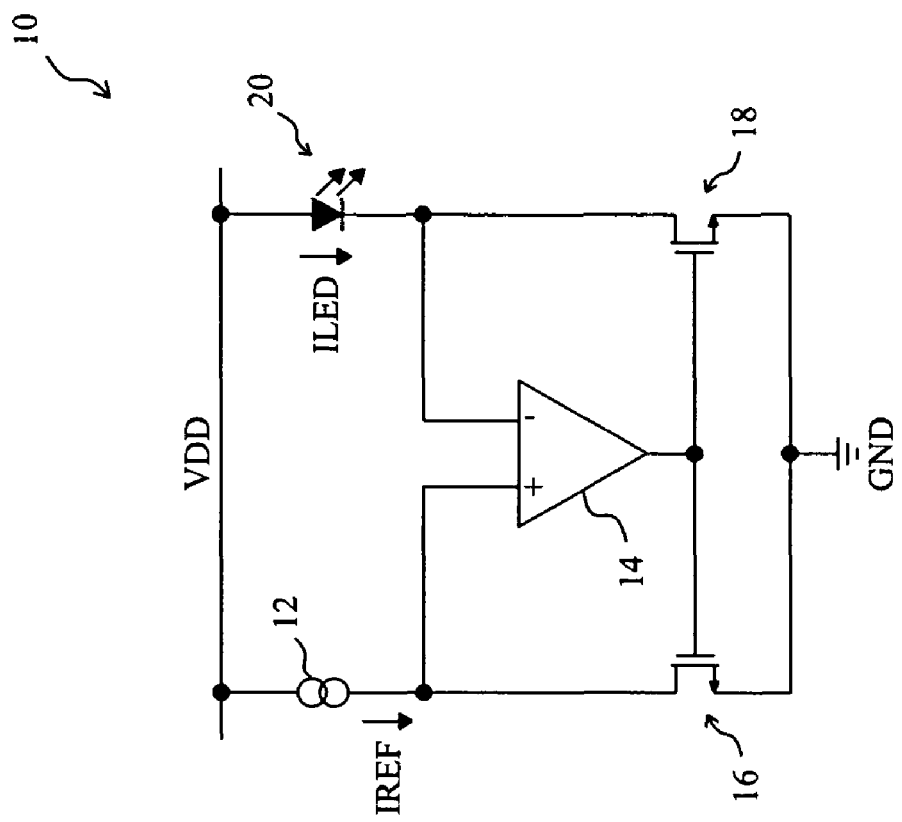
FIG. 1 is a circuit diagram of a conventional current regulator for driving a white LED.
Figure 2:
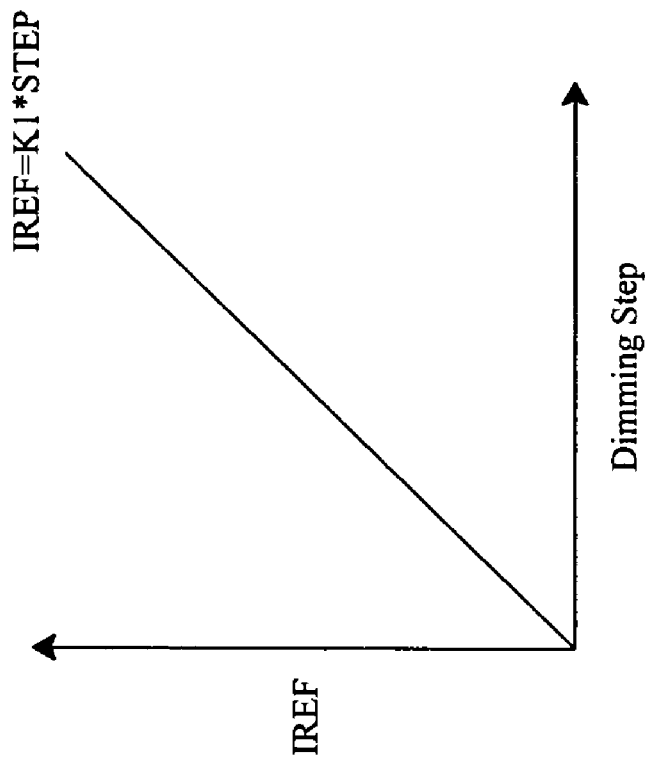
FIG. 2 is a diagram showing a curve which describes the relationship between the reference current and the dimming step of the white LED in the circuit of FIG. 1 in linear brightness control.
Figure 3:
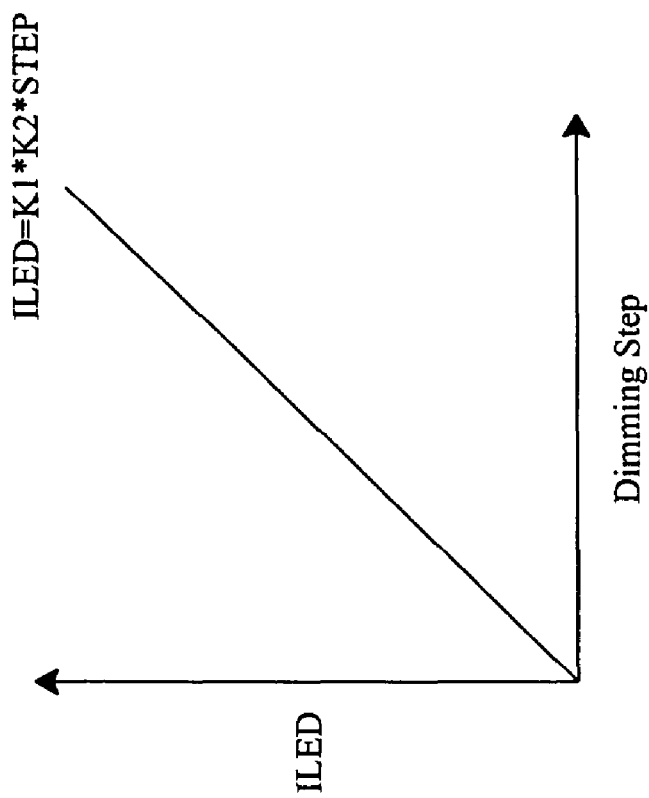
FIG. 3 is a diagram showing a curve defined by the relationship between the drive current and the dimming step based on the circuit of FIG. 1 and the linear brightness control of FIG. 2.
Figure 4:
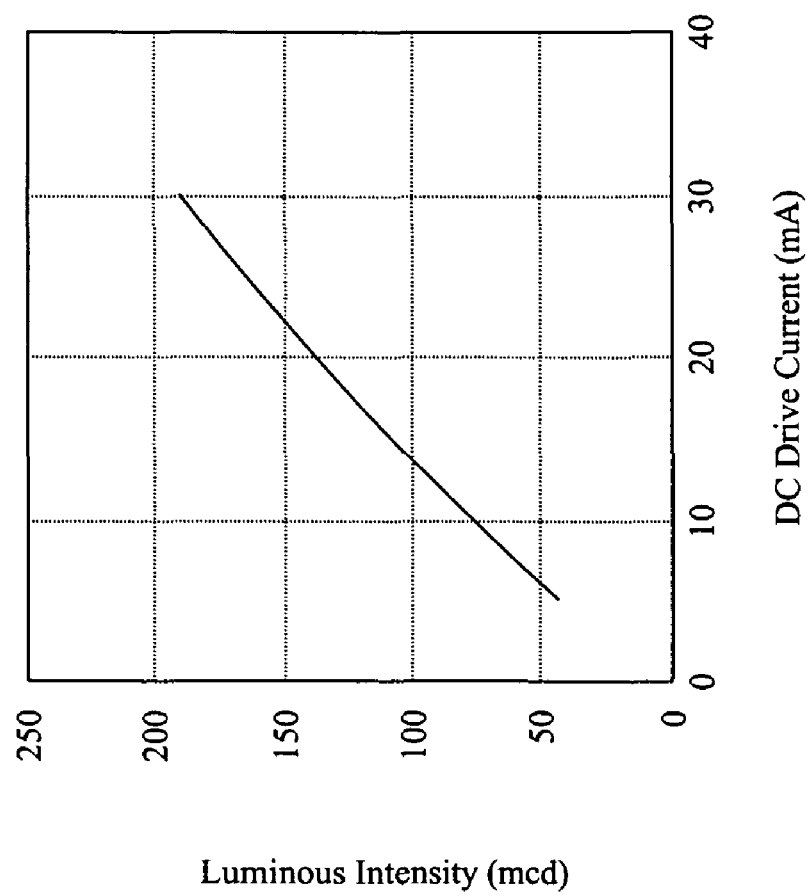
FIG. 4 is a diagram showing a curve which describes the relationship between the luminous intensity and the DC drive current of a white LED.
Figure 5:
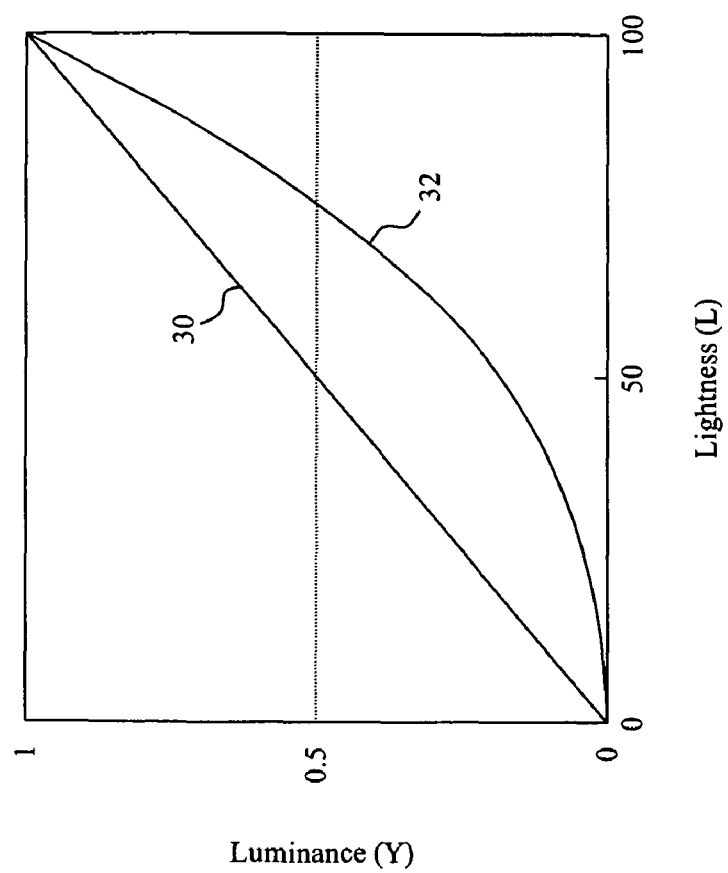
FIG. 5 is a diagram showing curves which describe the relationships between the luminance and the lightness of a white LED and between the luminance and the lightness perceived by human eyes.
Figure 6:
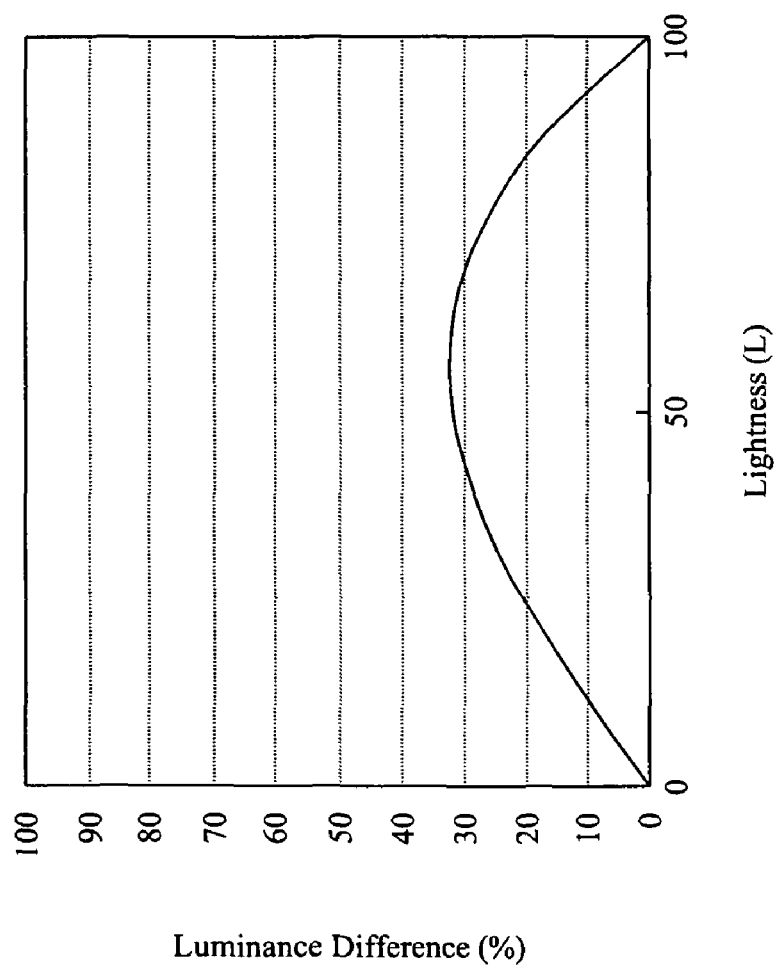
FIG. 6 is a diagram showing the error of the luminance between the curves of FIG. 5.
Figure 7:
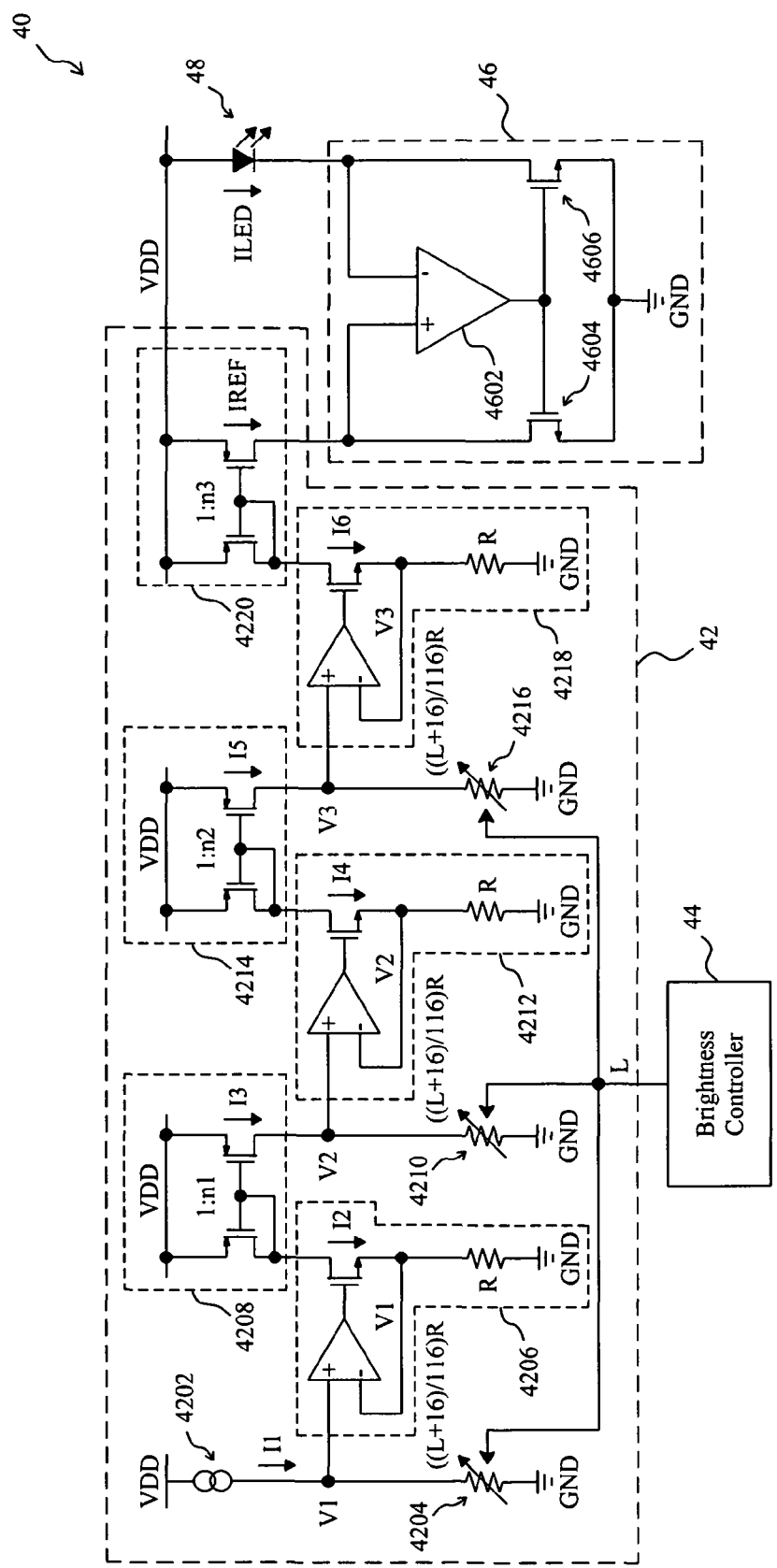
FIG. 7 is a circuit diagram of a first embodiment according to the present invention.

FIG. 7 shows a first embodiment according to the present invention. In a current regulator 40, a first current source 42 provides a reference current $IREF=K1\times((L+16)/116)^3$, where K1 is a constant and L represents lightness, a brightness controller 44 determines the value of L, which also represents the dimming step, and a second current source 46 generates a DC drive current ILED for a white LED 48 according to the reference current IREF. In this embodiment, the second current source 46 includes an operational amplifier 4602 and two transistors 4604 and 4606 configured to be a low drop-out (LDO) current source as that of FIG. 1. The transistor 4604 is connected between the first current source 42 and a ground terminal GND, the transistor 4606 is connected between the white LED 48 and the ground terminal GND, and the operational amplifier 4602 has a non-inverting input and an inverting input connected to the drains of the transistors 4604 and 4606 respectively, and an output connected to the gates of the transistors 4604 and 4606.

Figure 8:
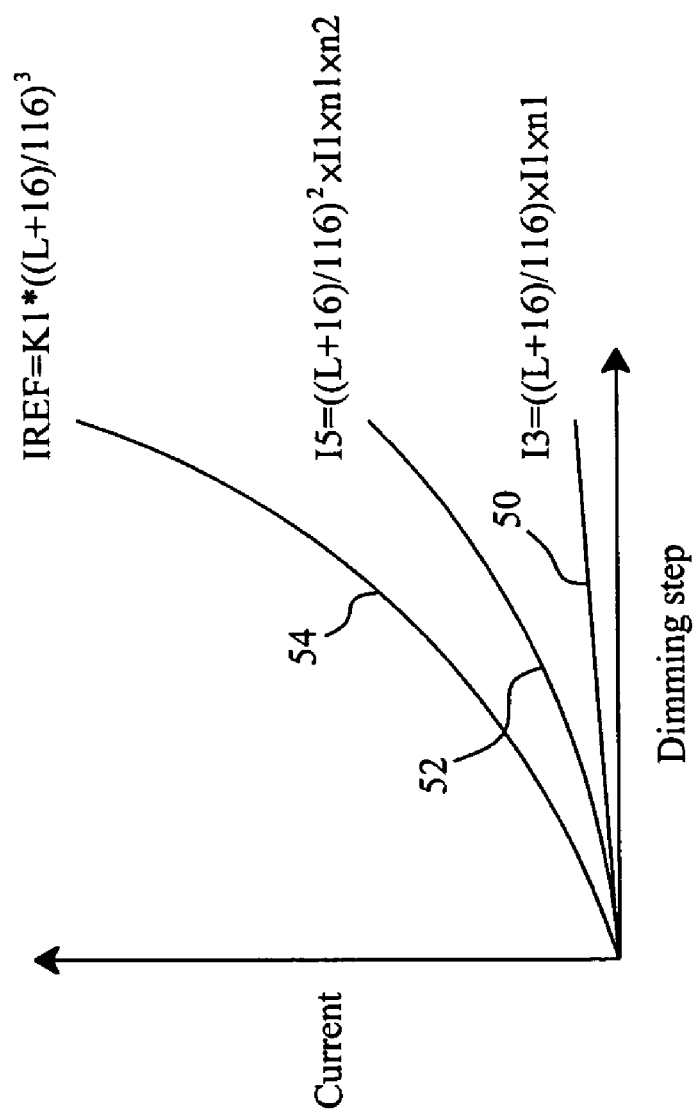
FIG. 8 is a diagram showing curves which describe the relationships between some currents and the dimming step in the circuit of FIG. 7.

FIG. 8 is a diagram showing curves 50, 52 and 54 which describe the relationships between the currents I3, I5 and IREF and the dimming step in the circuit of FIG. 7. Referring to FIG. 7, in the first current source 42, three variable resistors 4204, 4210 and 4216 have the same resistance $((L+16)/116)\times R$ controlled by the brightness controller 44, a current source 4202 provides a source current I1 flowing through the first variable resistor 4204 to generate a first dimming voltage $V1=((L+16)/116)\times R\times I1$, a first voltage-current converter 4206 converts the first dimming voltage V1 into a first dimming current $I2=((L+16)/116)\times I1$, a first current mirror 4208 mirrors the first dimming current I2 to generate a first mirror current $I3=((L+16)/116)\times I1\times n1$, which flows through the second variable resistor 4210 to generate a second dimming voltage $V2=((L+16)/116)^2\times R\times I1\times n1$ and has the relationship with the dimming step as shown by the curve 50 in FIG. 8, a second voltage-current converter 4212 converts the second dimming voltage V2 into a second dimming current $I4=((L+16)/116)^2\times I1\times n1$, a second current mirror 4214 mirrors the second dimming current I4 to generate a second mirror current $I5=((L+16)/116)^2\times I1\times n1\times n2$, which flows through the third variable resistor 4216 to generate a third dimming voltage $V3=((L+16)/116)^3\times R\times I1\times n1\times n2$ and has the relationship with the dimming step as shown by the curve 52 in FIG. 8, a third voltage-current converter 4218 converts the third dimming voltage V3 into a third dimming current $I6=((L+16)/116)^3\times I1\times n1\times n2$, and a third current mirror 4220 mirrors the third dimming current I6 to generate the reference current $IREF=((L+16)/116)^3\times I1\times n1\times n2\times n3=K1\times((L+16)/116)^3$, which has the relationship with the dimming step as shown by the curve 54 in FIG. 8.

Figure 9:
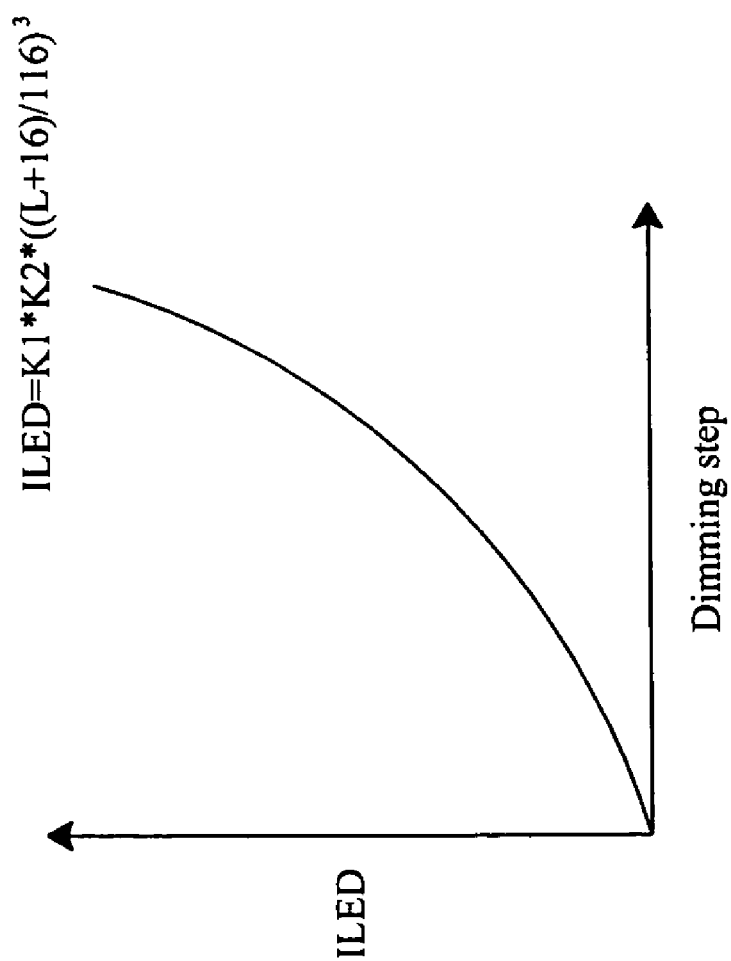
FIG. 9 is a diagram showing a curve which describes the relationship between the drive current ILED and the dimming step in the circuit of FIG. 7.
Figure 10:
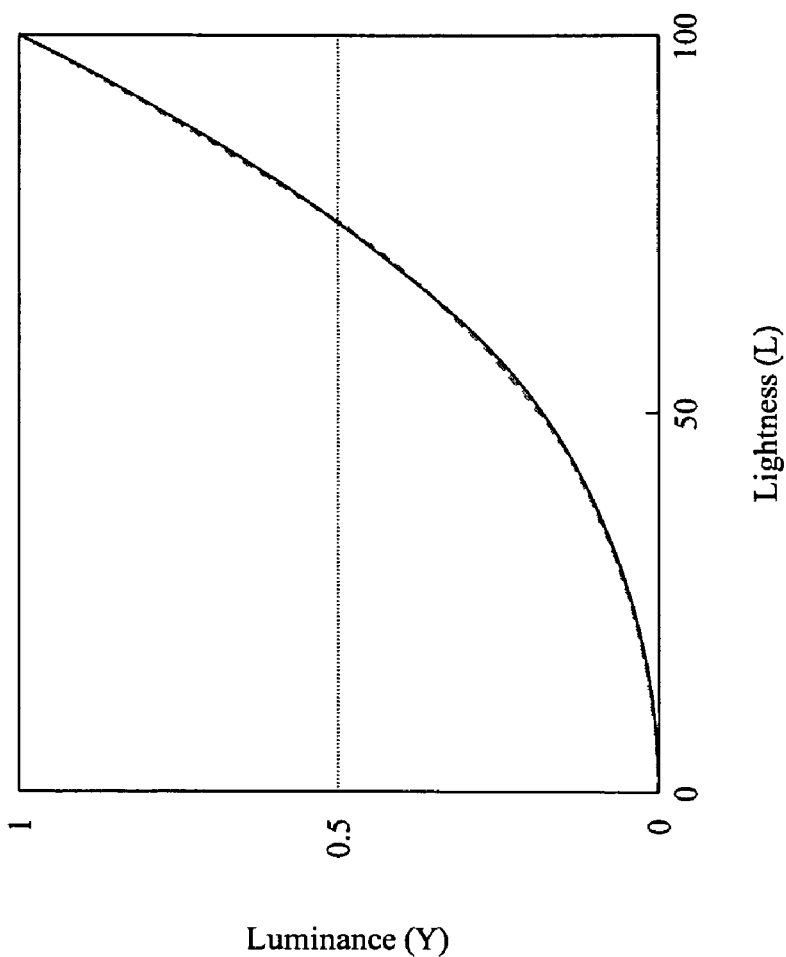
FIG. 10 is a diagram showing curves which describe the relationships between the luminance and the lightness of the white LED in FIG. 7 and between the luminance and the lightness perceived by human eyes.

FIG. 9 is a diagram showing a curve which describes the relationship between the drive current ILED and the dimming step in the circuit of FIG. 7. Referring to FIG. 7, in the second current source 46, due to the virtual short between the inputs of the operational amplifier 4602, the voltage between the gate and the drain of the transistor 4606 will be equal to that between the gate and the drain of the transistor 4604, and thus the transistor 4606 mirrors the reference current IREF in the transistor 4604 to generate the drive current ILED. Assuming that the size ratio of the transistor 4604 and 4606 is 1:K2, the drive current ILED can be expressed as ILED=K1×K2 ×((L+16)/116)$^3$ as shown in FIG. 9. FIG. 10 is a diagram showing a curve which describes the relationship between the luminance and the lightness of the white LED 48 in FIG. 7, and a dashed curve which describes the relationship between the luminance and the lightness perceived by human eyes. As shown in FIG. 10, the curves are almost overlapped. Thus, when the dimming step is changed by one, the variation in lightness perceived by human eyes is fixed. In other words, the dimming step of the current regulator 40 are linearly. proportional to the lightness perceived by human eyes, thereby allowing the white LED 48 to show linear luminance variation to human eyes without resorting to complex computation for selecting the appropriate dimming step. Moreover, waste can be avoided as the dimming step will not be partially left unused.

Figure 11:
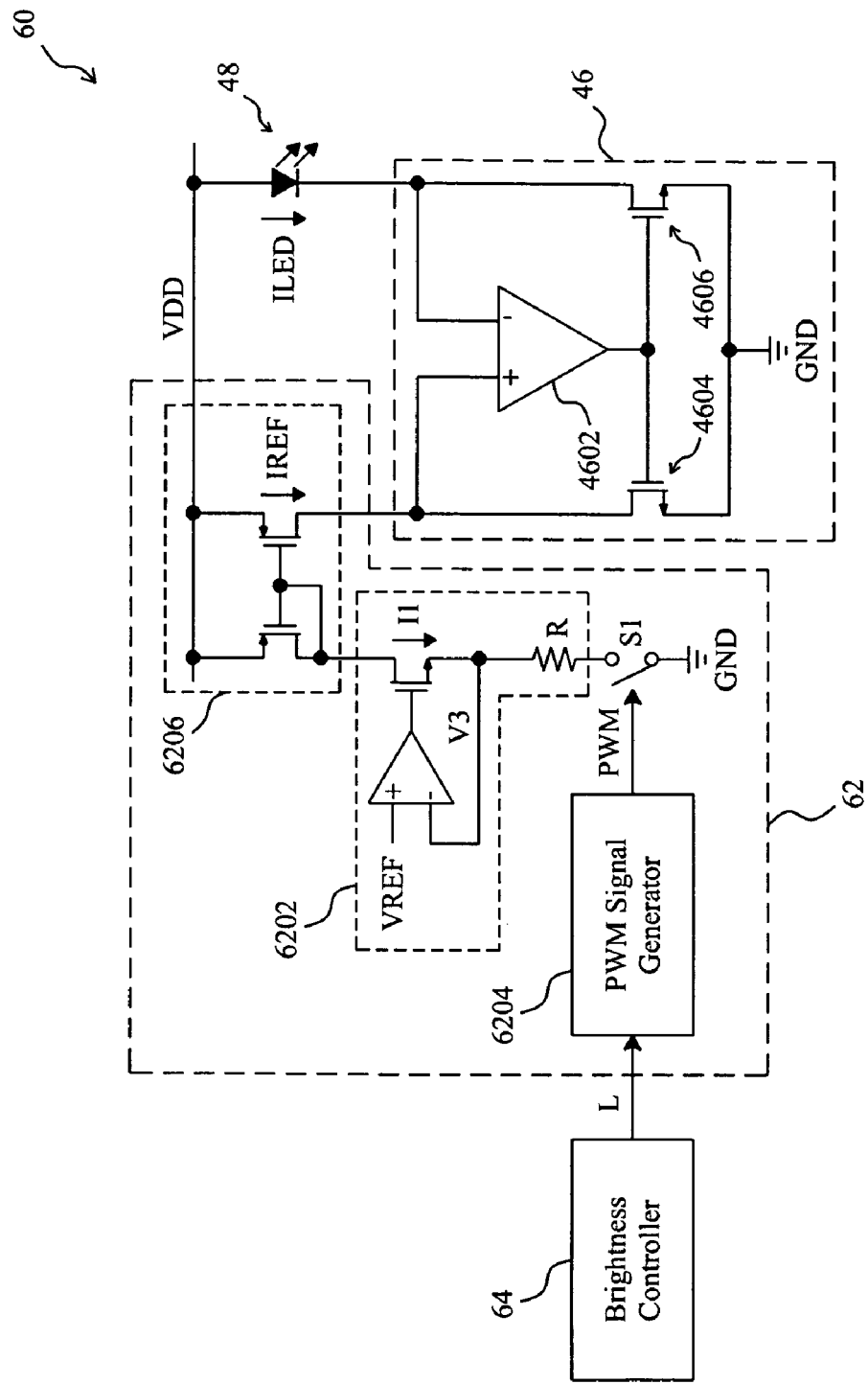
FIG. 11 is a circuit diagram of a second embodiment according to the present invention.
Figure 12:
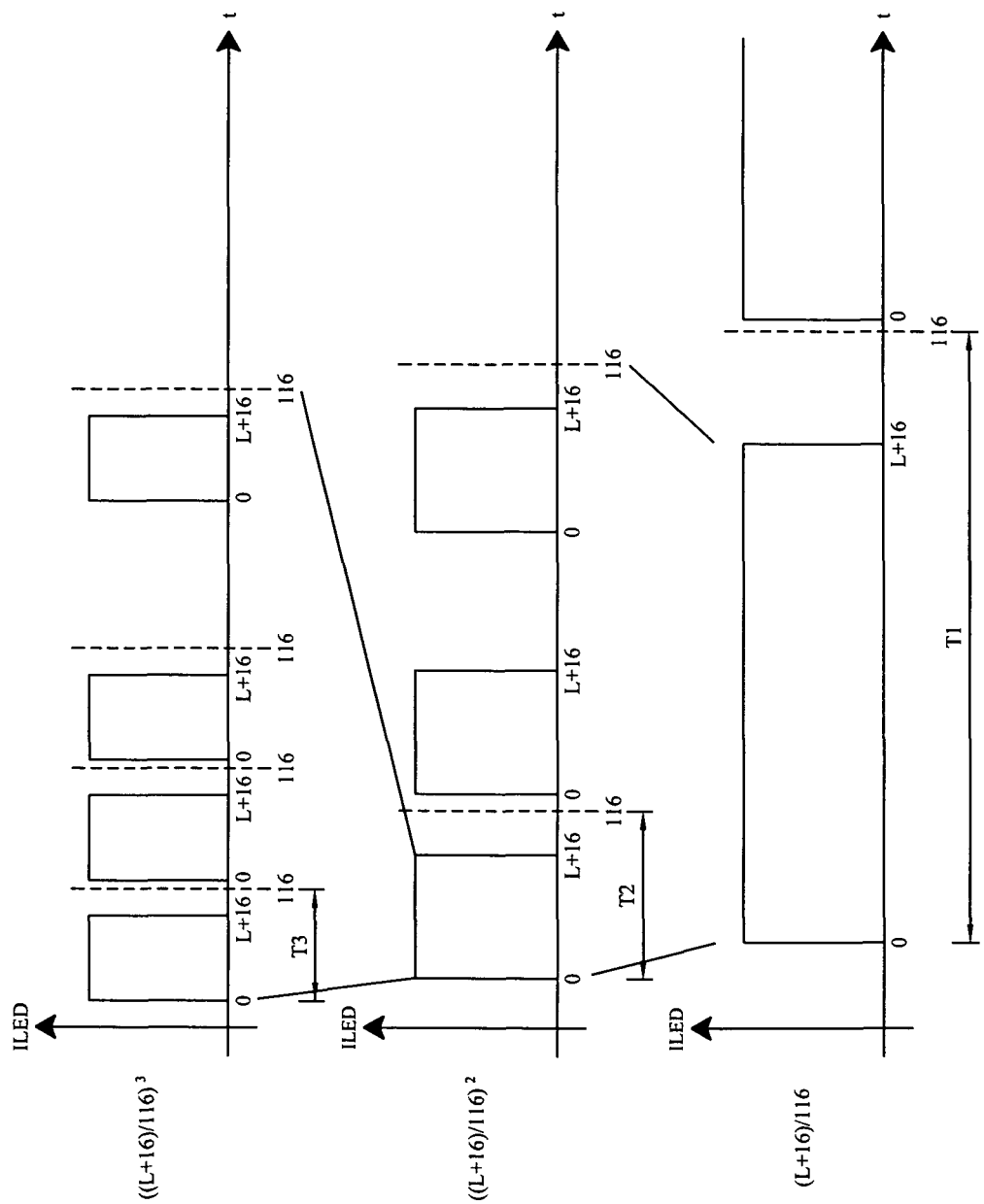
FIG. 12 is a waveform diagram of the control signal PWM in an embodiment for the circuit of FIG. 11.

FIG. 11 is a circuit diagram of a second embodiment according to the present invention. In a current regulator 60, a first current source 62 provides a reference current IREF=K1×((L+16)/116)$^3$ characterized by the curve 54 in FIG. 8, a brightness controller 64 determines the value of the lightness L, which also represents the dimming step in this embodiment, and a second current source 46 generates a drive current ILED for a white LED 48 according to the reference current IREF, which has the relationship with the dimming step as shown by the curve of FIG. 9. In the first current source 62, a voltage-current converter 6202 converts a reference voltage VREF into a dimming current I1, a pulse width modulation (PWM) signal generator 6204 generates a control signal PWM according to the output L of the brightness controller 64 to switch a switch S1 connected between the voltage-current converter 6202 and a ground terminal GND to switch the dimming current I1, thereby controlling the conduction time of the switched dimming current I1, and a current mirror 6206 mirrors the switched dimming current I1 to generate the reference current IREF. FIG. 12 is a waveform diagram of the control signal PWM in an embodiment for the circuit of FIG. 11, which includes a primary period T1 having a duty ((L+16)/116). The on-time of the primary period T1 includes a first sub-period T2 having a duty ((L+16)/116), and the on-time of the first sub-cycle T2 includes a second sub-period T3 having a duty ((L+16)/116). Hence, the reference current IREF has an average value equal to K1×((L+16)/116)$^3$, where K1=I1. Since the reference current IREF is linearly proportional to ((L+16)/116)$^3$, the drive current ILED is also linearly proportional to ((L+16)/116)$^3$. In other words, the curve which describes the relationship between the luminance and the lightness of the white LED 48 in FIG. 11 will coincide with the dashed curve which describes the relationship between the luminance and the lightness perceived by human eyes, as shown in FIG. 10. The dimming step of the current regulator 60 is thus linearly proportional to the perceived lightness.

Figure 13:
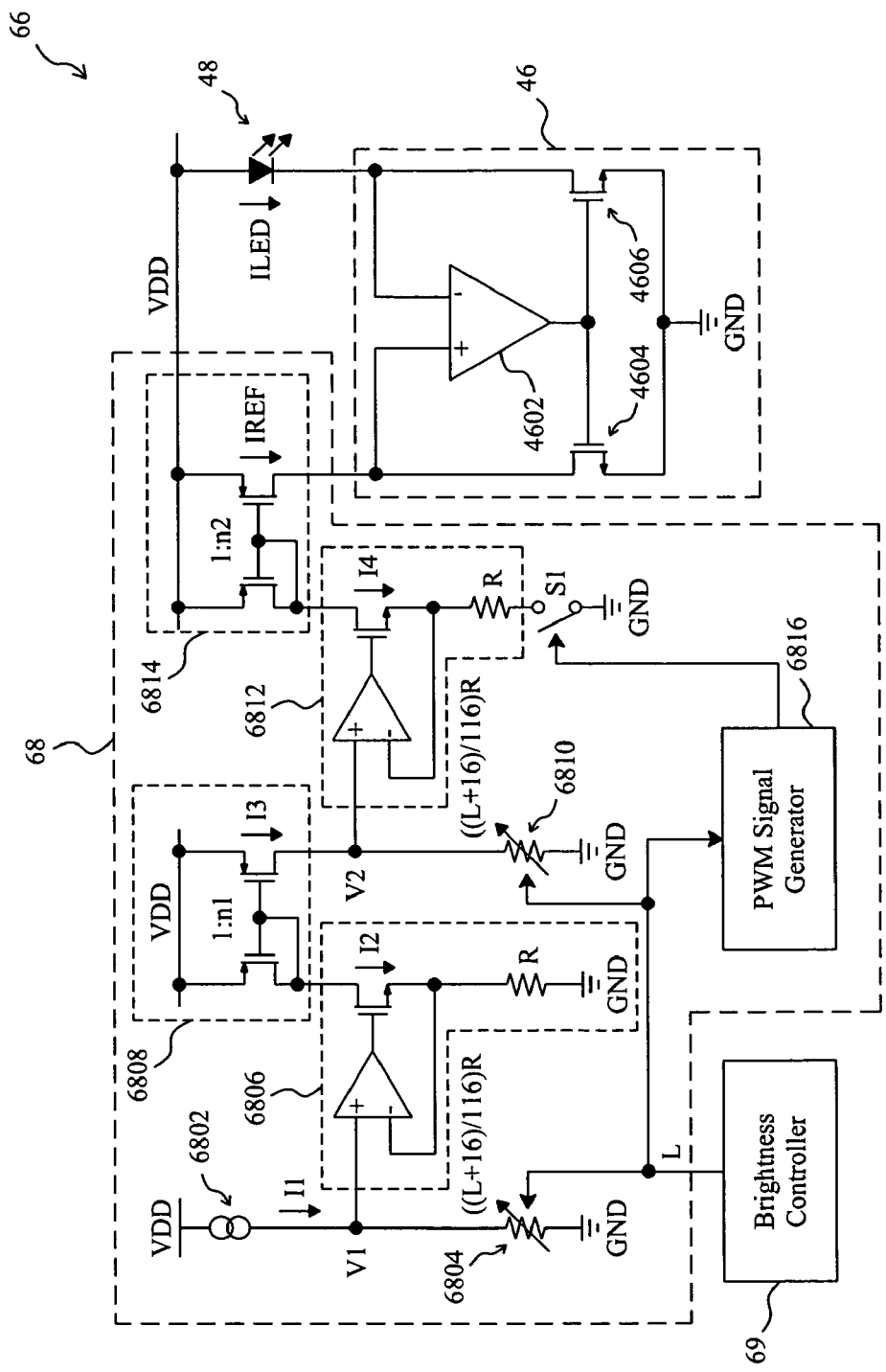
FIG. 13 is a circuit diagram of a third embodiment according to the present invention.
Figure 14:
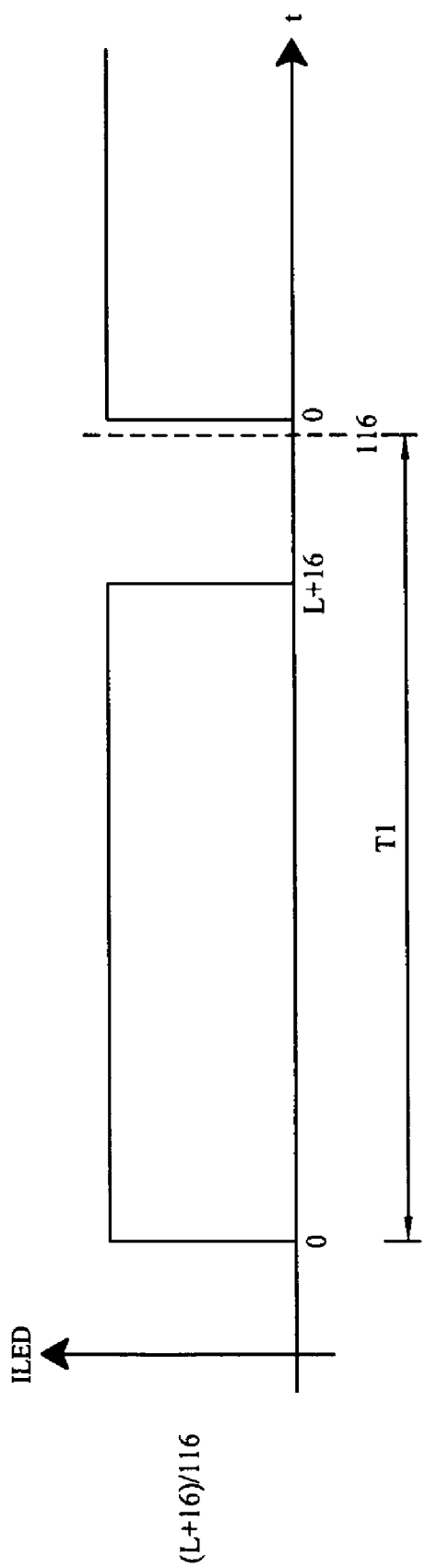
FIG. 14 is a waveform diagram of the control signal PWM in an embodiment for the circuit of FIG. 13.

FIG. 13 is a circuit diagram of a third embodiment according to the present invention. In a current regulator 66, a first current source 68 provides a reference current IREF=K1×((L+16)/116)$^3$ characterized by the curve 54 in FIG. 8, a brightness controller 69 determines the value of the lightness L, which also represents the dimming step in this embodiment, and a second current source 46 generates a drive current ILED for a white LED 48 according to the reference current IREF. In the first current source 6&, two variable resistors 6804 and 6810 have the same resistance ((L+16)/116)×R, a current source 6802 provides a source current I1 to the first variable resistor 6804 to generate a first dimming voltage V1=((L+16)/116)×R×I1 thereacross, a first voltage-current converter 6806 converts the first dimming voltage V1 into a first dimming current I2=((L+16) /116)×I1, a first current mirror 6808 mirrors the first dimming current I2 to generate a first mirror current I3=((L+16)/116)×I1×n1, which flows through the second variable resistor 6810 to generate a second dimming voltage V2=((L+16)/116)$^2$×R×I1×n1, a second voltage-current converter 6812 converts the second dimming voltage V2 into a second dimming current I4=((L+16)/116)$^2$×I1×n1, a switch S1 is connected between the second voltage-current converter 6812 and a ground terminal GND to switch the second dimming current I4, a PWM signal generator 6816 generates a control signal PWM according to the output L of the brightness controller 69 to switch the switch S1 to control the conduction time of the switched dimming current I4, and a second current mirror 6814 mirrors the switched dimming current I4 to generate the reference current IREF. FIG. 14 is a waveform diagram of the control signal PWM in an embodiment for the circuit of FIG. 13, which includes a period T1 having a duty ((L+16)/116). Since the control signal PWM has the duty ((L+16)/116), the reference current IREF will have an average value I4×n2×((L+16)/116). Further, since the switched dimming current 44 is equal to ((L+16)/116)$^2$×I1×n1, the average value of the reference current IREF will be equal to K1×((L+16)/116)$^3$, where K1=I1×n1×n2.

Figure 15:
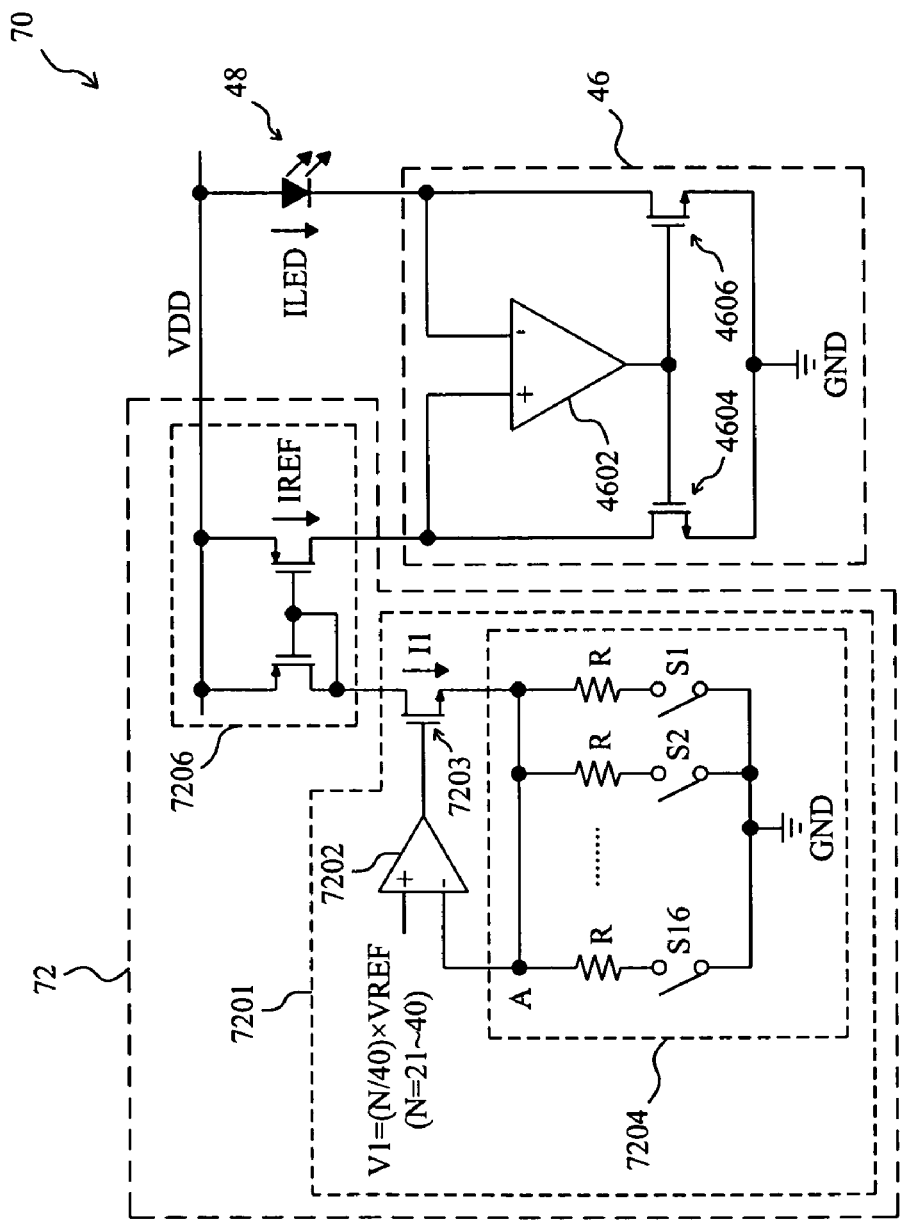
FIG. 15 is a circuit diagram of a fourth embodiment according to the present invention.

FIG. 15 is a circuit diagram of a fourth embodiment according to the present invention. In a current regulator 70, a first current source 72 provides a reference current IREF, and a second current source 46 generates a drive current ILED for a white LED 48 according to the reference current IREF. In this embodiment, a piecewise linear approach is used to obtain a curve approximating that defined by the equation Eq-5. In the first current source 72, a voltage-current converter 7201 converts a variable voltage V1=(N/40)×VREF into a dimming current I1, where N represents the dimming step in the range of 21-40 in this embodiment, and a current mirror 7206 mirrors the dimming current I1 to generate the reference current IREF. In the voltage-current converter 7201, an operational amplifier 7202 has a non-inverting input to receive the variable voltage V1, an inverting input connected to a node A to apply the voltage V1 thereto, a transistor 7203 has a drain connected to the current mirror 7206, a source connected to the node A, and a gate connected to an output of the operational amplifier 7202, a plurality of resistors R having an identical resistance are connected in parallel between the node A and a ground terminal GND to establish an equivalent resistor 7204, and a plurality of switches S1-S16 are serially connected to the resistors R respectively, to control the resistance of the equivalent resistor 7204 by switching the switches S1-S16. According to the variable voltage V1 and the resistance of the equivalent resistor 7204, which are both determined by the dimming step N, the dimming current I1 is established in the transistor 7203.

Figure 16:
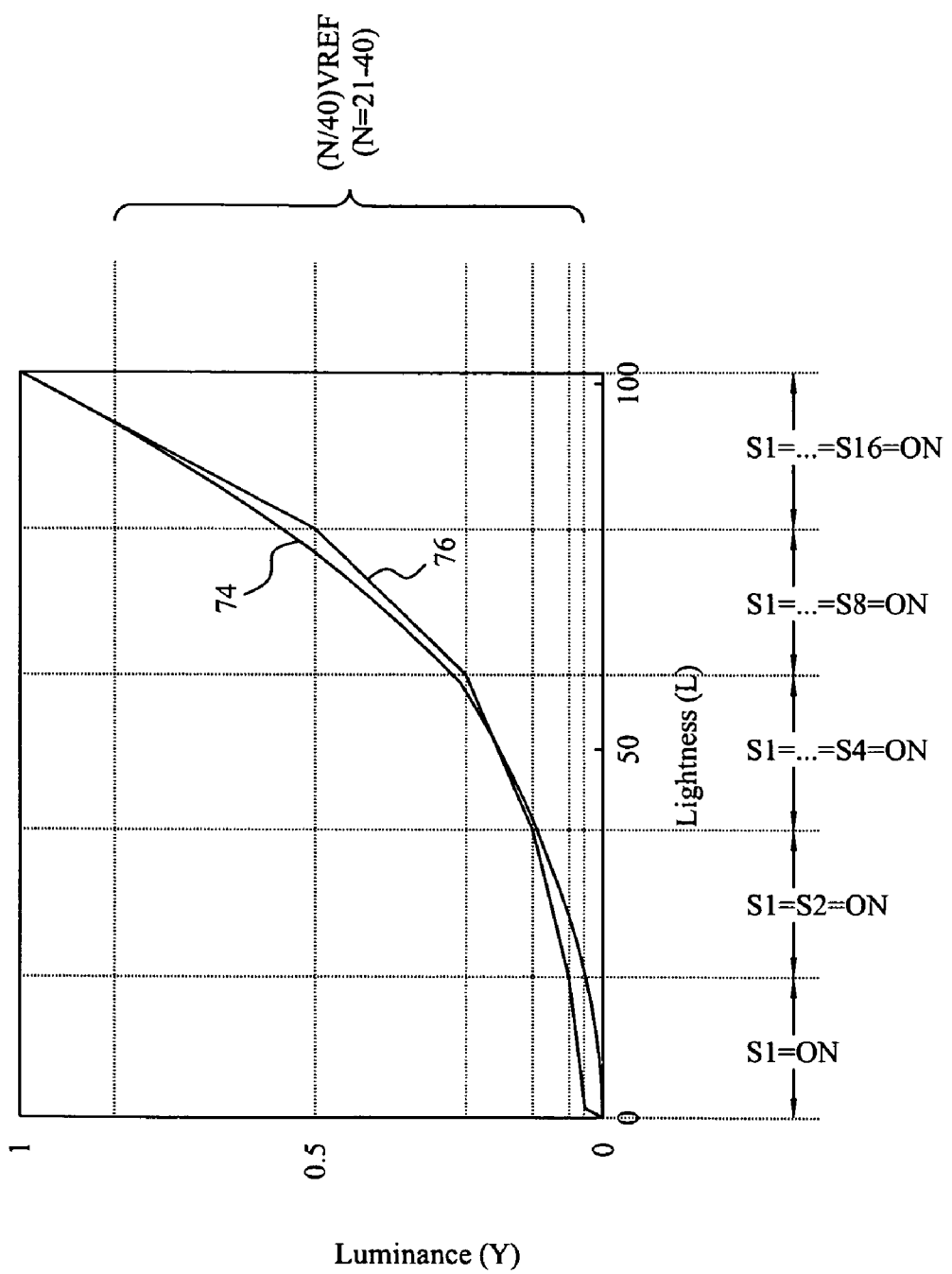
FIG. 16 is a diagram showing curves which describe the relationships between the luminance and the lightness of the white LED in FIG. 15 and between the luminance and the lightness perceived by human eyes.
Figure 17:
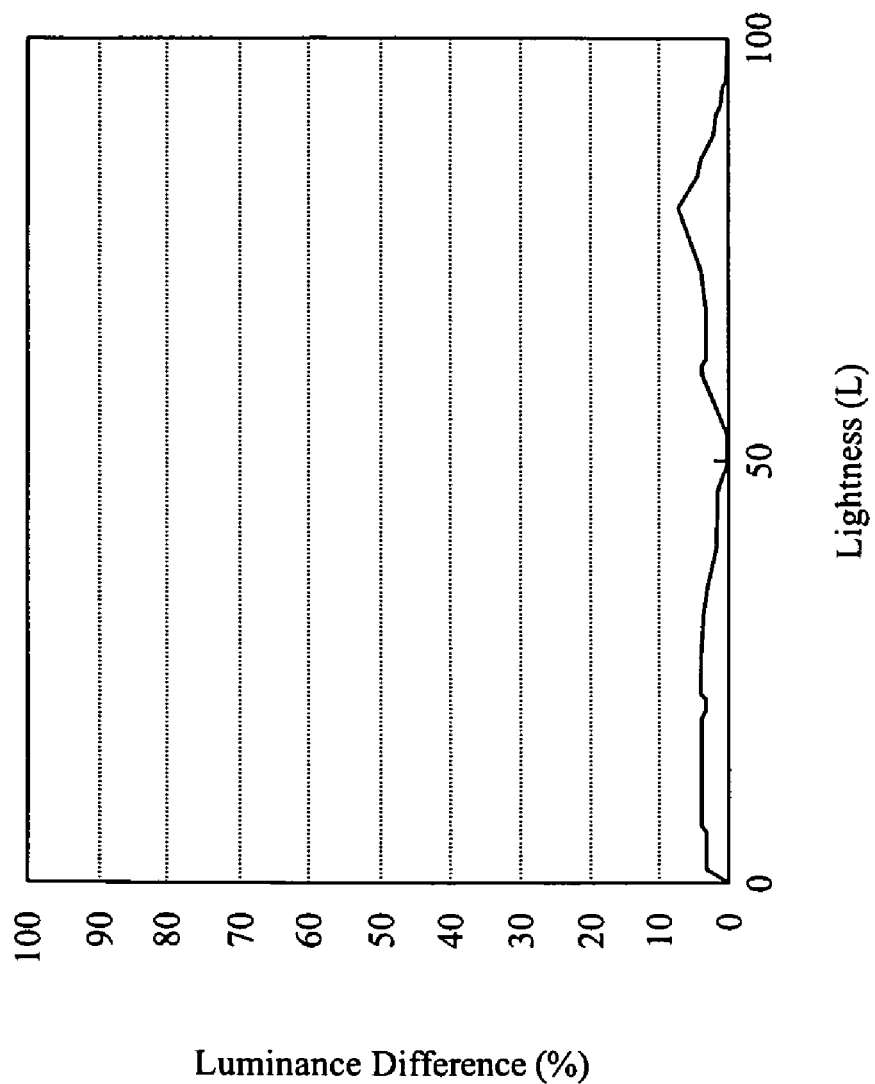
FIG. 17 is a diagram showing the error between the curves of FIG. 16.

FIG. 16 is a diagram showing a curve 74 which describes the relationship between the luminance and the lightness perceived by human eyes, and a curve 76 which describes the relationship between the luminance and the lightness of the white LED 48 in the current regulator 70. For example, referring to FIGS. 15 and 16, the curve 76 is divided into five pieces and the number of the dimming step N is 20, so that each piece of the curve 76 includes four dimming steps. The resistance of the equivalent resistor 7204 varies in each piece so as to change the increasing slope of the drive current ILED, as shown in FIG. 16. More specifically, in piece 1, the switch S1 is turned on and the other switches S2-S16 are turned off, so that the resistance of the equivalent resistor 7204 has the value R. In piece 2, the switches S1 and S2 are turned on and the other switches S3-S16 are turned off, so that the resistance of the equivalent resistor 7204 has the value R/2. In piece 3, the switches S1-S4 are turned on and the other switches S5-S16 are turned off, so that the resistance of the equivalent resistor 7204 has the value R/4. In piece 4, the switches S1-S8 are turned on and the other switches S9-S16 are turned off, so that the resistance of the equivalent resistor 7204 has the value R/8. In piece 5, all the switches S1-S16 are turned on, so that the resistance of the equivalent resistance 7204 has the value R/16. Obviously, the resistance of the equivalent resistor 7204 increases in a power of two. In other embodiments, the number of the pieces of the curve 76 which describes the drive current ILED may vary provided that the reference voltage VREF, the number of the dimming steps and the resistance R are chosen appropriately. As the number of the pieces increases, the curve 76 which describes the drive current ILED approximates the curve 74 more closely. FIG. 17 is a diagram showing the error between the curves 74 and 76 of FIG. 16. In this embodiment, the curve 76 differs from the curve 74 less than 10%, which means the curve 76 approximates the curve 74 very closely, and therefore, the white LED 48 will show approximately linear luminance variation to human eyes when the dimming step N is changed.

Figure 18:
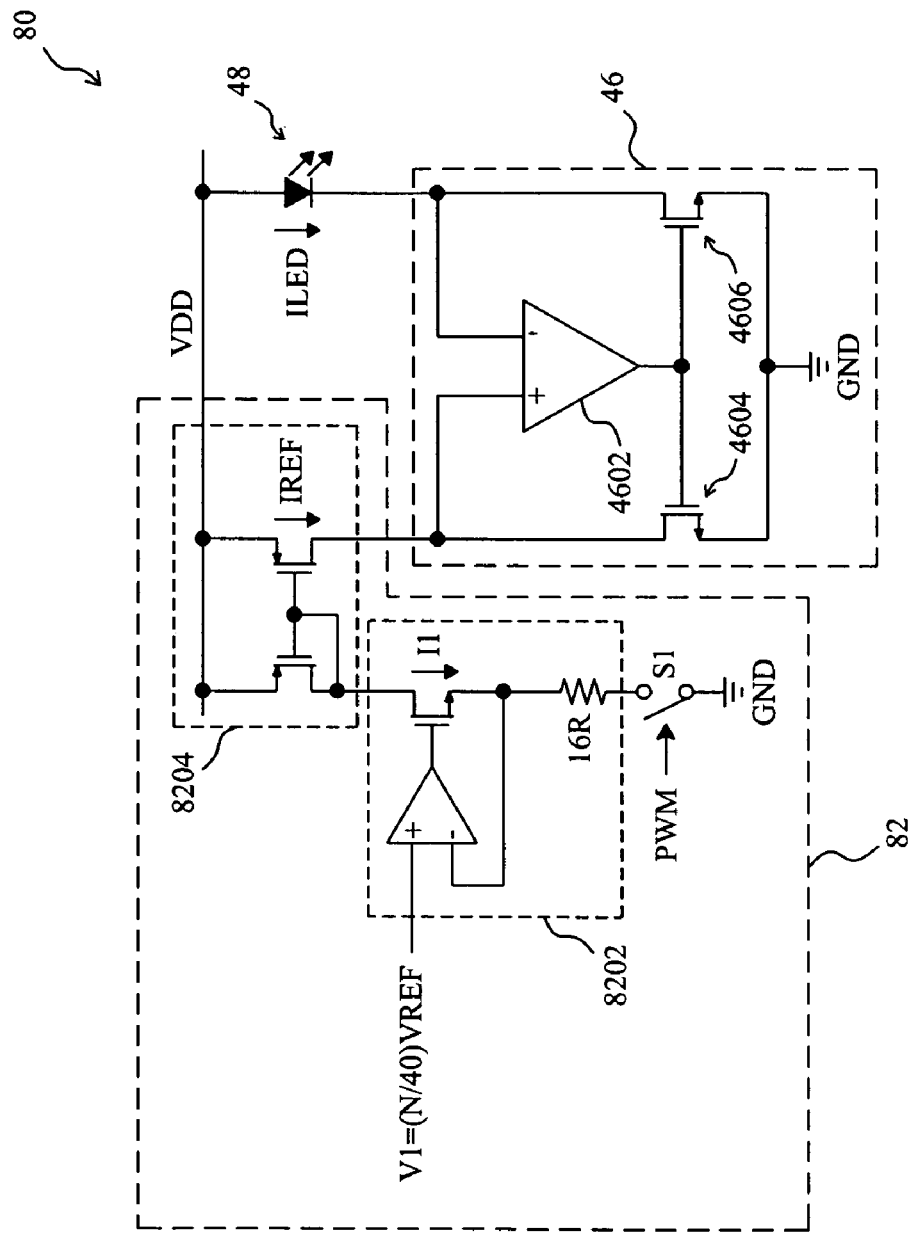
FIG. 18 is a circuit diagram of a fifth embodiment according to the present invention.
Figure 19:
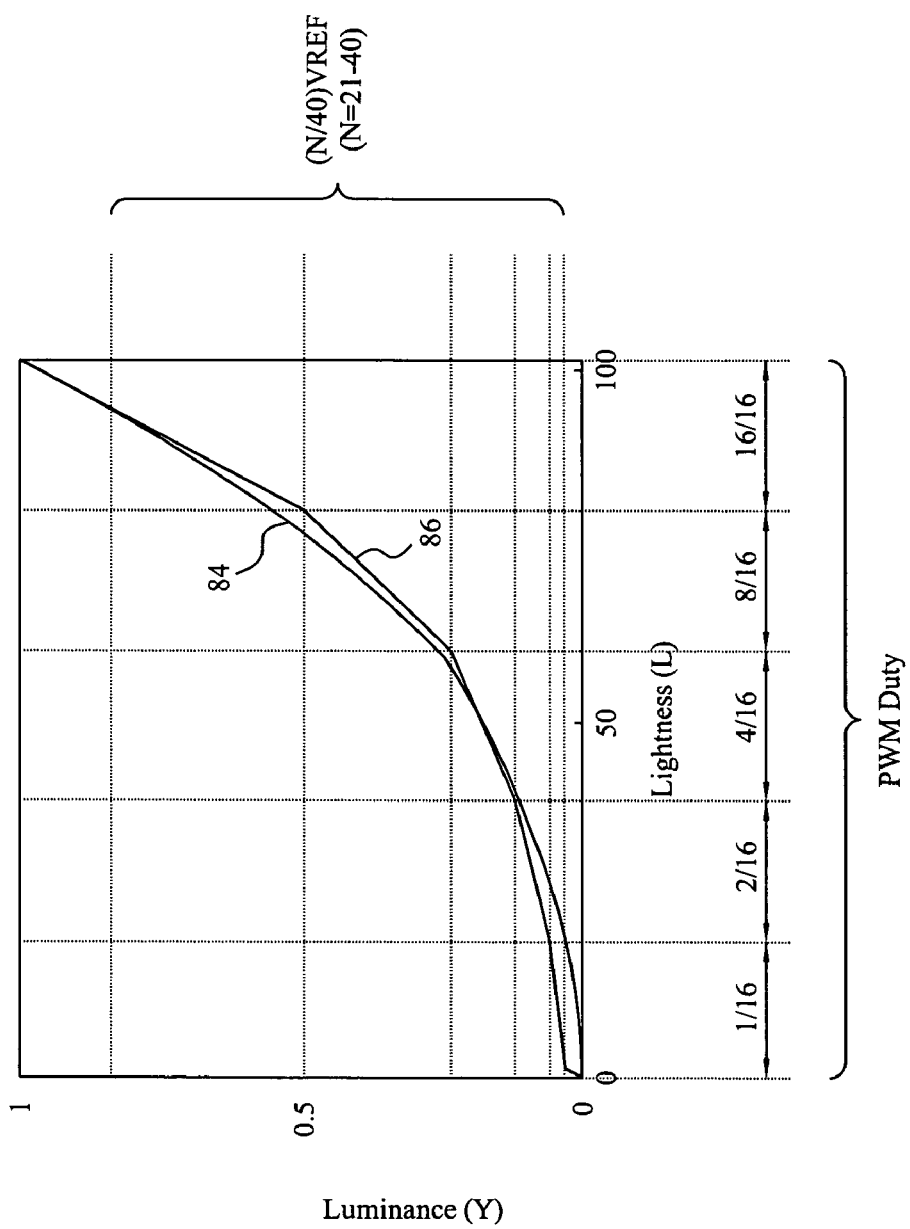
FIG. 19 is a diagram showing curves which describe the relationships between the luminance and the lightness of the white LED in FIG. 18 and between the luminance and the lightness perceived by human eyes.
Figure 20:
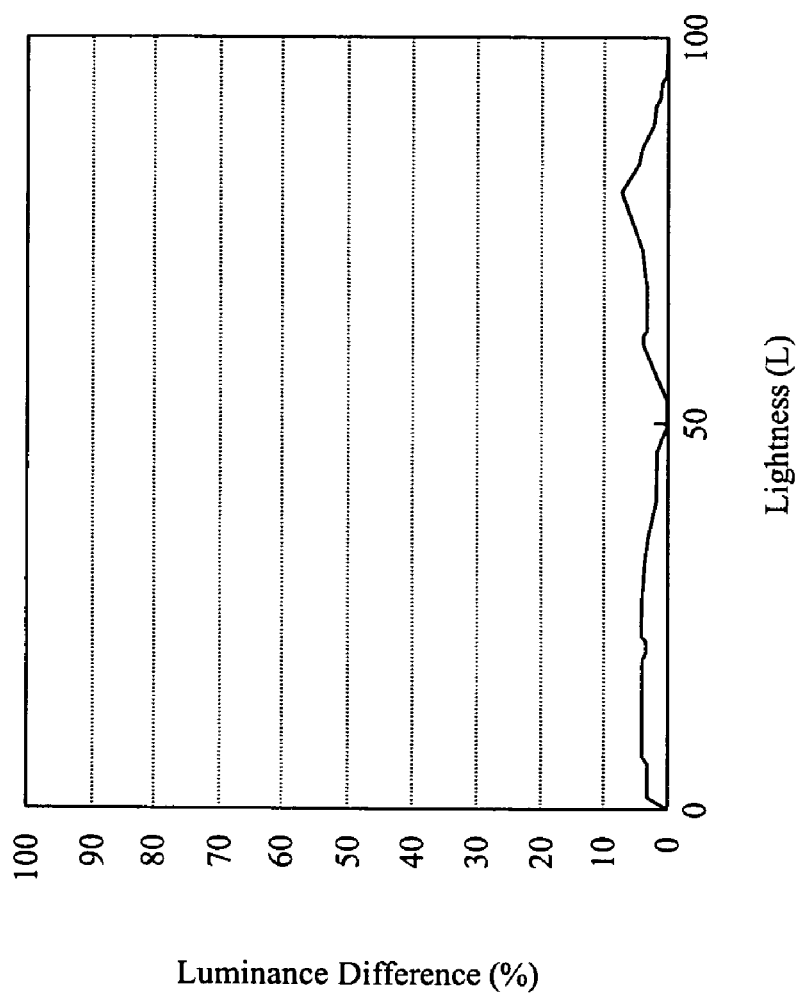
FIG. 20 is a diagram showing the error between the curves of FIG. 19.

FIG. 18 is a circuit diagram showing a fifth embodiment according to the present invention. A current regulator 80 includes a first current source 82 to provide a reference current IREF and a second current source 46 to generate a drive current ILED for a white LED 48 according to the reference current IREF. This embodiment also uses a piecewise linear approach to obtain a curve approximating that defined by the equation Eq-5. In the first current source 82, a voltage-current converter 8202 converts a variable voltage V1=(N/40)× VREF into a switched current I1, a switch S1 controlled by a control signal PWM is connected between the voltage-current converter 8202 and a ground terminal GND to control the conduction time of the switched current I1, and a current mirror 8204 mirrors the switched current I1 to generate the reference current IREF. FIG. 19 is a diagram showing a curve 86 which describes the relationship between the luminance and the lightness of the white LED 48 in FIG. 18, and a curve 84 which describes the relationship between the luminance and the lightness perceived by human eyes. For example, referring to FIGS. 18 and 19, the curve 86 representing the drive current ILED is divided into five pieces and the number of the dimming step N is 20, so that each piece includes four dimming steps. The control signal PWM has a different on-time in each piece. As can be seen in FIG. 19, the control signal PWM has the duty 1/16, 2/16, 4/16, 8/16, and 16/16 in these pieces respectively. The on-time of the control signal PWM in each piece is a power of two. When the on-time of the control signal PWM increases, the increasing slope of the curve 86 increases accordingly. In other embodiments, the number of the pieces of the curve 86 representing the drive current ILED may vary provided that the reference voltage VREF, the number of the dimming step N and the resistance R are chosen appropriately. As the number of the pieces increases, the curve 86 representing the drive current ILED approximates the curve 84 more closely. FIG. 20 is a diagram showing the error between the curves 84 and 86 of FIG. 19. In this embodiment, the curve 86 differs from the curve 84 less than 10%, which means the curve 86 approximates the curve 84 very closely, and therefore, the white LED 48 will show approximately linear luminance variation to human eyes when the dimming step N is changed.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A current regulator for driving a white LED, comprising:
   a brightness controller determining the value of a parameter L which represents lightness;
   a first current source connected to the brightness controller and providing a reference current in proximately linear proportion to $((L+a)/b)^n$, where a, b and n are constant numbers, and n is greater than or equal to 2; and
   a second current source connected to the first current source and generating a drive current for the white LED according to the reference current.

2. The current regulator of claim 1, wherein the constant number a is 16, the constant number b is 116, and the constant number n is 3.

3. The current regulator of claim 1, wherein the first current source comprises:
   a first function circuit connected to the brightness controller to generate a first dimming current in proximately linear proportion to (L+a)/b according to an input signal; and
   a second function circuit connected to the brightness controller and the first function circuit to generate a second dimming current in proximately linear proportion to $((L+a)/b)^2$ according to an output of the first function circuit.

4. The current regulator of claim 3, wherein the first current source further comprises a third function circuit connected to the brightness controller and the second function circuit to generate a third dimming current in proximately linear proportional to $((L+a)/b)^3$ according to an output of the second function circuit.

5. The current regulator of claim 1, wherein the first current source comprises:
   a first variable resistor connected to the brightness controller to be controlled to have a resistance in proximately linear proportion to (L+16)/116, and receiving a source current to generate a first dimming voltage thereacross;
   a first voltage-current converter connected to the first variable resistor to convert the first dimming voltage into a first dimming current;
   a first current mirror connected to the first voltage-current converter to mirror the first dimming current to generate a first mirror current;
   a second variable resistor connected to the brightness controller to be controlled to have a resistance in proximately linear proportion to (L+16)/116, and to the first current mirror to receive the first mirror current to generate a second dimming voltage thereacross;
   a second voltage-current converter connected to the second variable resistor to convert the second dimming voltage into a second dimming current;
   a second current mirror connected to the second voltage-current converter to mirror the second dimming current to generate a second mirror current;
   a third variable resistor connected to the brightness controller to be controlled to have a resistance in proximately linear proportion to (L+16)/116, and to the second current mirror to receive the second mirror current to generate a third dimming voltage thereacross;
a third voltage-current converter connected to the third variable resistor to convert the third dimming voltage into a third dimming current; and
a third current mirror connected to the third voltage-current converter to mirror the third dimming current to generate the reference current.

6. The current regulator of claim 5, wherein the resistances of the first, second and third variable resistors are proximately identical to each other.

7. The current regulator of claim 1, wherein the first current source comprises:
a voltage-current converter converting a reference voltage into a dimming current;
a switch connected to the voltage-current converter and controlled by a control signal to switch the dimming current; and
a current mirror connected to the voltage-current converter to mirror the switched dimming current to generate the reference current;
wherein the control signal includes a primary period having a duty about (L+16)/116, the on-time of the primary period includes a first sub-period having a duty about (L+16)/116, and the on-time of the first sub-period includes a second sub-period having a duty about (L+16)/116.

8. The current regulator of claim 1, wherein the first current source comprises:
a first variable resistor connected to the brightness controller to be controlled to have a resistance in proximately linear proportion to (L+16)/116, and receiving a source current to generate a first dimming voltage thereacross;
a first voltage-current converter connected to the first variable resistor to convert the first dimming voltage into a first dimming current;
a first current mirror connected to the first voltage-current converter to mirror the first dimming current to generate a first mirror current;
a second variable resistor connected to the brightness controller to be controlled to have a resistance in proximately linear proportion to (L+16)/116, and to the first current mirror to receive the first mirror current to generate a second dimming voltage thereacross;
a second voltage-current converter connected to the second variable resistor to convert the second dimming voltage into a second dimming current;
a switch connected to the second voltage-current converter and controlled by a control signal having a duty about (L+16)/116 to switch the second dimming current; and
a second current mirror connected to the second voltage-current converter to mirror the switched second dimming current to generate the reference current.

9. The current regulator of claim 8, wherein the resistances of the first and second resistors are proximately identical to each other.

10. The current regulator of claim 1, wherein the second current source generates the drive current in proximate proportion to the reference current.

11. The current regulator of claim 10, wherein the second current source comprises:
an operational amplifier having a first input, a second input and an output;
a first transistor having a drain connected to the first input of the operational amplifier and the first current source to receive the reference current, a source connected to a ground terminal, and a gate connected to the output of the operational amplifier; and
a second transistor having a drain connected to the second input of the operational amplifier, a source connected to the ground terminal, and a gate connected to the output of the operational amplifier;
wherein the second transistor mirrors the reference current to generate the drive current in its drain.

12. The current regulator of claim 1, wherein the reference current and the lightness have a first relationship approximating a second relationship between luminance and lightness perceived by human eyes.

13. A current regulator for driving a white LED, comprising:
a first current source providing a reference current varying with a dimming step; and
a second current source connected to the first current source to generate a drive current for the white LED according to the reference current;
wherein the reference current and the dimming step have a first relationship approximating a second relationship between luminance and lightness perceived by human eyes and the second relationship is characterized by $Y/Yn=((L+a)/b)^n$, where a and b are constant numbers, Y represents luminance, Yn represents luminance of a fully white status, L represents lightness, and n is greater than or equal to 2.

14. The current regulator of claim 13, wherein the second current source generates the drive current in proximate proportion to the reference current.

15. The current regulator of claim 14, wherein the second current source comprises:
an operational amplifier having a first input, a second input and an output;
a first transistor having a drain connected to the first input of the operational amplifier and receiving the reference current, a source connected to a ground terminal, and a gate connected to the output of the operational amplifier; and
a second transistor having a drain connected to the second input of the operational amplifier, a source connected to the ground terminal, and a gate connected to the output of the operational amplifier, and mirroring the reference current to generate the drive current.

16. The current regulator of claim 13, wherein the first current source comprises:
a variable resistor having a resistance determined by the dimming step;
a transistor having a source connected to the variable resistor, a drain and a gate;
an operational amplifier having a first input to receive a variable voltage varying with the dimming step, a second input connected to the variable resistor and the source of the transistor, and an output connected to the gate of the transistor, in association with the variable resistor and the transistor to convert the variable voltage into a dimming current in the transistor; and
a current mirror connected to the drain of the transistor to mirror the dimming current to generate the reference current.

17. The current regulator of claim 16, wherein the variable resistor has a resistance being a power of two.

18. The current regulator of claim 13, wherein the first current source comprises:
a voltage-current converter converting a reference voltage into a dimming current; and a switch connected to the voltage-current converter and controlled by a control signal to switch the dimming current;

a current mirror connected to the voltage-current converter to mirror the switched dimming current to generate the reference current;

wherein the on-time of the control signal and the reference voltage are both determined by the dimming step.

19. The current regulator of claim 18, wherein the on-time is a power of two.

20. The current regulator of claim 13, wherein the first relationship is characterized by a first curve, the second relationship is characterized by a second curve, and the first curve differs from the second curve less than 10%.

21. The current regulator of claim 13, wherein the second relationship is characterized by $Y/Yn=((L+16)/116)^3$, where Y represents luminance, Yn represents luminance of a fully white status, and L represents lightness.

22. A method for driving a white LED, comprising the steps of:

generating a reference current varying with a dimming step; and generating a drive current for the white LED according to the reference current;

wherein the reference current and the dimming step have a first relationship approximating a second relationship between luminance and lightness perceived by human eyes and the second relationship is characterized by $Y/Yn=((L+a)/b)^n$, where a and b are constant numbers, Y represents luminance, Yn represents luminance of a fully white status, L represents lightness, and n is greater than or equal to 2.

23. The method of claim 22, wherein the step of generating a drive current for the white LED according to the reference current comprises the step of mirroring the reference current to generate the drive current.

24. The method of claim 22, wherein the step of generating a reference current varying with a dimming step comprises the steps of:

applying a variable voltage to a variable resistor to generate a dimming current; and mirroring the dimming current to generate the reference current;

wherein the variable voltage and the resistance of the variable resistor are both determined by the dimming step.

25. The method of claim 24, wherein the resistance is a power of two.

26. The method of claim 22, wherein the step of generating a reference current varying with a dimming step comprises the steps of:

converting a reference voltage into a dimming current;

switching the dimming current by a control signal; and mirroring the switched dimming current to generate the reference current;

wherein the on-time of the control signal and the reference voltage are both determined by the dimming step.

27. The method of claim 26, wherein the on-time is a power of two.

28. The method of claim 22, wherein the first relationship is characterized by a first curve, the second relationship is characterized by a second curve, and the first curve differs from the second curve less than 10%.

29. The method of claim 22, wherein the second relationship is characterized by $Y/Yn=((L+16)/116)^3$, where Y represents luminance, Yn represents luminance of a fully white status, and L represents lightness.

* * * * *